Feb. 16, 1965 R. D. WOODSON 3,170,026
CIRCULATION SYSTEM FOR FLUID IN PIPES CARRYING ELECTRIC CABLES
Filed April 30, 1962
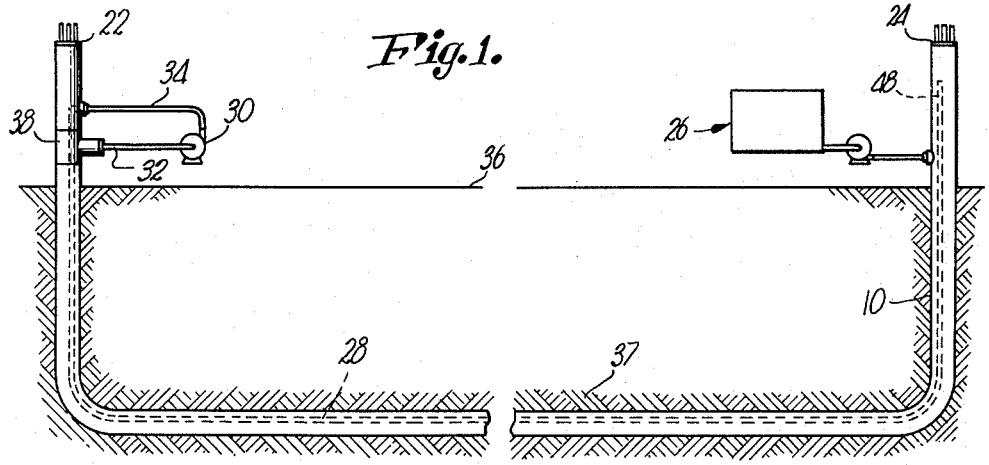
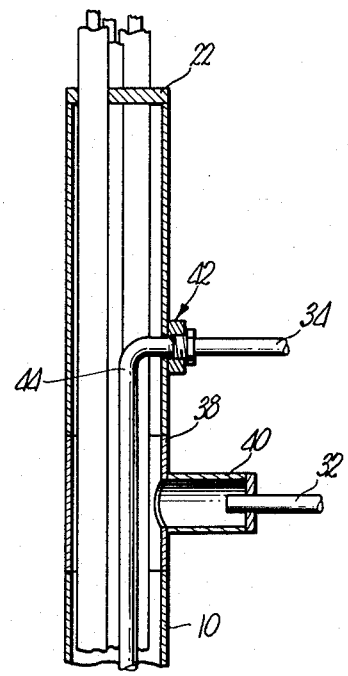
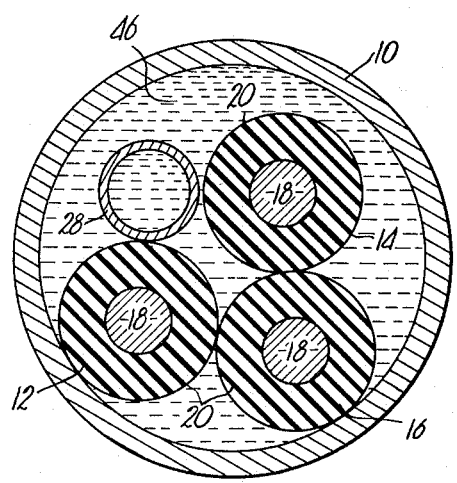
INVENTOR.
Riley D. Woodson
BY
Hovey, Schmidt, Johnson + Hovey
ATTORNEYS.

United States Patent Office 3,170,026
Patented Feb. 16, 1965

3,170,026
CIRCULATION SYSTEM FOR FLUID IN PIPES
CARRYING ELECTRIC CABLES
Riley D. Woodson, 2012 W. 50th Terrace,
Shawnee Mission, Kans.
Filed Apr. 30, 1962, Ser. No. 191,031
6 Claims. (Cl. 174—15)

This invention relates to a circulation system for fluids which are utilized in pipes carrying electric cables, and more particularly, to means for causing movement of said fluid within such pipes.

Specifically, this invention relates to the circulation of a dielectric fluid in oil and gas filled pipes of the type which carry electric cables and are normally disposed underground, and more particularly, to a system for circulating such dielectric fluid through a conduit or tubular means which is located within the pipe, together with the electric cables. The purpose of providing such a dielectric fluid within cable-carrying pipes is to provide an insulating and heat transfer means within the pipe, whereby heat generated by the electric cables may be transmitted therefrom through the dielectric fluid and the pipe and thence to the earth surrounding the pipe.

The utilization of a pipe disposed beneath the ground to carry electric cables from point-to-point and thereby protect the same is known, but despite efforts to compensate for the various environmental factors encountered by such pipes, such factors including the thermal resistivity of the soil, the saturation factors related to the moisture content of the soil, the ambient temperatures of the material surrounding the cable, the conditions at the earth's surface adjacent the pipe, and similar factors, problems have nevertheless arisen due to the heat generated by the cables as current is carried therethrough.

In an effort to compensate for such problems it has heretofore been necessary to insure that overheating of cable and the insulating material surrounding the cable, will not occur at any point along the cable, which efforts have required that considerable excess capacity be designed into the underground cables and the pipe surrounding the same, all of which has led to considerable cost and economic loss.

Such compensation has been directed toward eliminating or overcoming environmental conditions which are poor for adequate cooling, and which are commonly referred to as "hot spots," such hot spots determining the maximum safe loadings which can be applied to the cable. The exact location and severity of conditions at such hot spots is difficult to accurately determine inasmuch as cable-carrying pipes heretofore known have been designed in such a manner that the dielectric fluid carried therein is not in motion, but rather is static and quiescent and thus, all of the heat generated within the pipe by the cables must be dissipated at the point along the pipe where it is initially generated. Some unsuccessful efforts have been directed toward compensating for this problem by cooling the dielectric fluid by means disposed externally of the pipe, but this and other efforts have proved impractical and costly.

Accordingly, it is the most important object of this invention to overcome the objectionable features above mentioned by providing a circulation system for the dielectric fluid in a pipe carrying electric cables, which circulation system includes a conduit extending axially of the pipe and having means at one end thereof for introducing fluid thereinto, and an open end at the other end thereof whereby fluid passing through the conduit or conduits, may be reintroduced into the main pipe.

Yet another aim of this invention is to provide a circulation system for fluid in a pipe carrying electric cables which will eliminate "hot spot" conditions along the axial length of the pipe by circulating the dielectric fluid at a low velocity axially inside of the pipe enclosure and at the same time carrying heat generated at any point and absorbed by the dielectric fluid along the pipe, thus dissipating such heat through the pipe wall to the earth and thereby averaging out the quantitatively uncertain factors of soil temperature and thermal resistivity along the pipe length, whereby the entire assembly may operate effectively at an average but uniform rate of heat transfer to the earth, and thereby maintain uniform temperatures in the cable insulation and the dielectric fluid.

Yet another aim of this invention is to provide a circulation system for fluid in a pipe carrying electric cables, the components of said circulation system being entirely contained within the pipe itself except for a suitable pump which is disposed adjacent one end of the pipe and which is utilized to draw fluid from the interior of the pipe and to introduce such fluid into the conduit carried axially of the pipe whereby said fluid may pass along the conduit throughout the length of the pipe to the open other end thereof where it is reintroduced into the pipe. Through the utilization of such a system, the dielectric fluid within the pipe is moved at low velocity from one end of the pipe to the other, absorbing heat from the electric cables and dissipating the heat to the pipe walls as the dielectric fluid moves along the pipe.

Other aims of this invention include the provision of a circulation system for fluid in a pipe carrying electric cables, which system is coupled with the pipe in such a manner that it will not interfere with the functioning of the electric cables extending therethrough in case of a failure of the circulation system; the provision of a circulation system that will not increase the hazards caused by leakage of the dielectric fluid inasmuch as the system utilizes conduits which are completely enclosed within the dielectric fluid spaces of the cable-carrying pipe; and the provision of a circulation system which is easily and quickly installed within a pipe carrying electric cables through the utilization of a conduit which can be disposed within the pipe in the same manner as the electric cables.

In the drawing:

FIGURE 1 is a diagrammatic view of a pipe carrying electric cables showing the same in position beneath the ground and having the circulation system as a part thereof;

FIG. 2 is an enlarged, fragmentary, sectional view of one end of the pipe showing the manner in which the pump of the circulation system is coupled thereto; and FIG. 3 is a sectional view through the pipe.

The present invention contemplates the provision of a pipe 10 which is normally disposed beneath the earth, whereby to receive therewithin, electric cables to protect the cables and carry the same from one point to another. In the form chosen for illustration, the pipe 10 is cylindrical in configuration and has disposed therewithin three electric cables 12, 14 and 16, although it will be appreciated that the pipe may assume any cross-sectional configuration and may contain any desired number of electrical cables. Each of cables 12, 14 and 16 has a central current carrying core 18 and a layer of insulation disposed thereabout, said insulation being designated as 20.

The pipe 10 carrying cables 12, 14 and 16 is sealed at the ends 22 and 24 thereof by a suitable cap or other sealing means whereby a closed system is created, the cables 12, 14 and 16 extending through said closure means and passing on to suitable connections with electrical circuits. A pressure supply apparatus broadly designated as 26, is coupled with pipe 10 at end 24 thereof in the embodiment chosen for illustration, and said pressure supply apparatus is used to maintain the closed system at a pressure above atmospheric.

A conduit or tube 28 is disposed within pipe 10, and it will be appreciated that one or more conduits such as 28, may be utilized in carrying out this invention. In the embodiment chosen for illustration, the conduit 28 is circular in configuration, although here again, it will be appreciated that the same may be of any desired cross-sectional configuration. Disposed exteriorly of pipe 10 and at a point adjacent end 22 thereof, is a pump 30 having an intake or suction portion 32 and an output or delivery portion 34. The pump 30 is shown as being disposed above the ground line 36 beneath which the major stretch of pipe 10 is disposed. In the form chosen for illustration, a single pump 30 is illustrated, although it will be appreciated that, depending upon the length of the pipe 10 and the particular fluid used therein, multiple pumping stations such as 30 may be utilized in the manner hereinafter described and such pumps may be interposed in the pipe 10 at any desired point.

The intake or suction portion 32 of pump 30 is suitably placed in communication with the interior of pipe 10 through utilization of a T-fitting or the like which has its cross member 38 set into pipe 10 and its stem 40 extending laterally outwardly therefrom, as best illustrated in FIG. 2 of the drawing.

The output or delivery portion 34 of pump 30 is suitably placed in communication with conduit 28 by means of a sealed fitting 42 provided with the wall of pipe 10, all as clearly illustrated in FIG. 2 of the drawing. Said sealed fitting 42 is coupled with one end 44 of conduit 28 and allows the reintroduction into conduit 28 of fluid drawn from the interior of pipe 10 by suction portion 32 of pump 30.

Said fluid, designated as 46, is carried within the interior of pipe 10 and occupies the entire space therein not assumed by the cables 12, 14 and 16 and the conduit or tube 28. Thus, when the pipe is initially placed beneath the ground, the same is filled with a suitable dielectric fluid, the system closed, and pressure supplied thereto by apparatus 26.

As hereinabove pointed out, it has, in the past, been the practice to allow fluid 46 to remain static or quiescent within the pipe 10 and to merely serve as a static heat transfer means for heat generated by the cables 12, 14 and 16, whereby such heat may be passed through the fluid and the wall of the pipe 10 and thus into the earth 37 surrounding the pipe.

This system has proven unsatisfactory inasmuch as hot spots develop at points along the length of the pipe 10 and an excess of capacity must be built into the system in order to compensate for such hot spots while such capacity is not normally necessary throughout the remainder of the system.

Thus, the present circulation system for fluid in a pipe carrying electric cables allows a low velocity movement of the fluid 46 axially of the pipe 10 from one end 22 thereof to the opposite end 24. This is accomplished by actuation of pump 30 which, through suction or intake portion 32 thereof, in communication with the interoir of pipe 10, serves to draw the fluid 46 from pipe 10, pass the same through the pump 30, and then through delivery portion 34 of the pump whereby the fluid 46 is introduced into the end 44 of conduit 28. The fluid then moves along conduit 28 throughout the full length of the pipe 10 to the other end 48 of conduit 28, which other end 48 is open, allowing the overflow of the fluid 46 from conduit 28 into the interior of the pipe 10 also occupied by fluid 46. Such fluid is then moved in a direction along pipe 10 opposite to the direction in which fluid in conduit 28 flows, and the steps of circulation above described are again carried out whereby a continuous circulation of the fluid 46 within pipe 10 is accomplished.

Having thus described the invention, what is claimed as new and desired to be secured by Letters Patent is:

1. In a circulation system for fluid in a pipe carrying electric cables; tube means carried within said pipe exteriorly of the cables; and a pump coupled to one end of said tube means for introducing fluid thereinto, the intake of said pump being in communication with said pipe whereby to draw fluid therefrom, the other end of said tube means being open and in communication with the interior of said pipe.

2. In a circulation system for fluid in a pipe carrying electric cables; tube means carried within said pipe exteriorly of the cables and extending axially thereof for substantially the full length of the pipe; and a pump coupled with one end of the tube means for introducing fluid thereinto from the pipe, the other end of the tube means being in communication with the interior of the pipe whereby fluid may pass from the tube means into the pipe.

3. A circulation system for fluid in a pipe carrying electric cables as set forth in claim 2, wherein said pump is located at one end of the pipe and said other open end of the tube means is located at the opposite end of the pipe.

4. A circulation system as set forth in claim 3, wherein said fluid is dielectric.

5. A circulation system for fluid in a pipe carrying electric cables as set forth in claim 2 wherein said other, open end of said tube means is entirely within the confines of said pipe.

6. In a circulation system for fluid in a pipe carrying electric cables; a tube within said pipe, exteriorly of said cables, said tube extending substantially the full length of said pipe; sealing means at each end of the pipe to retain the fluid therein, said cables extending through said sealing means, said tube being between said sealing means; a pump coupled with one end of said tube and said pipe, the intake of said pump being in communication with said pipe whereby to draw fluid therefrom, the output of said pump being in communication with said tube whereby to deliver fluid thereto, the other end of said tube being entirely within the confines of said pipe and being open at a point spaced from the corresponding pipe end sealing means whereby fluid may pass from said other end of the tube into the pipe.

References Cited in the file of this patent
UNITED STATES PATENTS

| | | |
|---|---|---|
| 2,222,574 | Robertson | Nov. 19, 1940 |
| 2,803,692 | Richards et al. | Aug. 20, 1957 |
| 3,013,101 | Domenach | Dec. 12, 1961 |